United States Patent
Oshihara et al.

(10) Patent No.: US 8,155,782 B2
(45) Date of Patent: Apr. 10, 2012

(54) FLUID HEATING APPARATUS

(75) Inventors: Kenzo Oshihara, Yokohama (JP); Ryuuta Yamaguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 495 days.

(21) Appl. No.: 12/373,411

(22) PCT Filed: Aug. 3, 2007

(86) PCT No.: PCT/JP2007/065673
§ 371 (c)(1),
(2), (4) Date: Jan. 12, 2009

(87) PCT Pub. No.: WO2008/016190
PCT Pub. Date: Feb. 7, 2008

(65) Prior Publication Data
US 2009/0308361 A1 Dec. 17, 2009

(30) Foreign Application Priority Data

Aug. 4, 2006 (JP) ................................. 2006-213207
Jul. 31, 2007 (JP) ................................. 2007-198632

(51) Int. Cl.
*G06F 19/00* (2011.01)
(52) U.S. Cl. ...................................... 700/202; 700/121
(58) Field of Classification Search .................. 700/202, 700/207, 300, 153, 121; 422/129, 242; 429/400–535
See application file for complete search history.

(56) References Cited

U.S. PATENT DOCUMENTS

| | | | |
|---|---|---|---|
| 4,807,584 A | 2/1989 | Davis | |
| 5,799,867 A * | 9/1998 | Misawa | 237/2 B |
| 5,927,087 A * | 7/1999 | Ishikawa | 62/174 |
| 6,430,949 B2 * | 8/2002 | Noro et al. | 62/183 |
| 6,561,017 B1 * | 5/2003 | Claussen et al. | 73/146 |
| 2003/0159354 A1 | 8/2003 | Edlund et al. | |
| 2004/0265225 A1 | 12/2004 | Walston et al. | |
| 2006/0156627 A1 * | 7/2006 | Brantley et al. | 48/61 |

FOREIGN PATENT DOCUMENTS

| | | |
|---|---|---|
| JP | 61-135974 A | 6/1986 |
| JP | 2004-162586 A | 6/2004 |
| JP | 2004-257334 A | 9/2004 |
| JP | 2005-180222 A | 7/2005 |
| JP | 2006-183469 A | 7/2006 |

OTHER PUBLICATIONS

U.S. Appl. No. 12/373,406, filed Jan. 12, 2009, Oshihara et al.
K. Oshihata et al., USPTO Non-Final Office Action, U.S. Appl. No. 12/373,406, May 25, 2011, 8 pgs.
K. Oshihatra et al., USPTO Final Office Action, U.S. Appl. No. 12/373,406, Jan. 31, 2012, 11 pgs.

* cited by examiner

*Primary Examiner* — Kidest Bahta
(74) *Attorney, Agent, or Firm* — Foley & Lardner LLP

(57) ABSTRACT

A fluid heating apparatus heats fluid in a passage to a target temperature. The fluid heating apparatus includes a fluid heating unit that heats the fluid, a fluid temperature measuring unit that measures a temperature of the fluid, and a pressure control unit that controls a pressure in the passage such that the pressure becomes equal to a target pressure. While the fluid in the passage is heated to the target temperature and when a temperature estimated from the thermal conductivity and specific heat is not increased, the pressure control unit increases the target pressure. According to a fluid heating method, when the fluid is heated by the fluid heating apparatus, the pressure control unit controls the pressure of the fluid such that the pressure becomes equal to or higher than a critical pressure.

14 Claims, 13 Drawing Sheets

(a)

(b)

(a)

(b)

(a)

(b)

(a)

(b)

(a)

(b)

(a)

(b)

FLUID HEATING APPARATUS

TECHNICAL FIELD

The present invention relates to a fluid heating apparatus.

BACKGROUND ART

Conventionally, in a fluid heating apparatus, there is disclosed a technique in which after a deposit is generated in a fuel passage, a pressure therein is increased to blow the deposit off (see Japanese Patent Application Laid-open No. 2006-183469). It is conceived that when fluid flowing through a metal tube is heated from a location outside the metal tube, molecular motion in a region near a tube wall is intensified by heat, and the molecule becomes gas. That is, as shown in FIG. 1, density of a region R2 near a tube wall R1 is lowered, and thermal conductivity of fluid is largely lowered. As a result, heat stays in fluid near the tube wall, the metal tube is locally heated and deposit is generated.

It was observed that when fluid is fuel such as hydrocarbon and alcohol, there were some molecules (hot spot) which became considerably hot. The present inventors thought that the molecules were thermally cracked and a precipitation region R3 of carbon as shown in FIG. 2 was formed in a region near the tube wall. As countermeasures, the inventors found that the density in the region near the tube wall R1 was held by increasing the pressure of the fluid as shown in FIG. 3, deterioration of thermal conductivity of fluid could be avoided, local heating could be avoided, and carbon precipitation could be suppressed.

The present invention has been achieved in view of the problem of the conventional technique and new findings, and an object of the present invention is to provide a fluid heating apparatus capable of preventing a passage from being locally heated, and suppressing carbon precipitation (generation of deposition and caulking).

DISCLOSURE OF THE INVENTION

To solve the above problem, the present inventors studied very hard and as a result, they found that the problem could be solved by controlling a pressure such that the thermal conductivity of fluid was not lowered, and they completed the present invention. That is, a fluid heating apparatus of the present invention heats fluid in a passage to a target temperature. The fluid heating apparatus includes a fluid heating unit that heats the fluid, a fluid temperature measuring unit that measures a temperature of the fluid, and a pressure control unit that controls a pressure in the passage such that the pressure becomes equal to a target pressure. While the fluid in the passage is heated to the target temperature and when a temperature difference of fluid in a flowing direction of the fluid exceeds a predetermined value, the pressure control unit increases the target pressure. According to the invention, since the pressure is controlled such that the thermal conductivity of the fluid is not lowered, it is possible to prevent the passage from being locally heated, and precipitation of carbon (generation of deposit and caulking) can be suppressed. With this configuration, a region where the fluid is heated can be made smaller, and the fluid heating apparatus can be downsized.

BEST MODE FOR CARRYING OUT THE INVENTION

Figure 1:
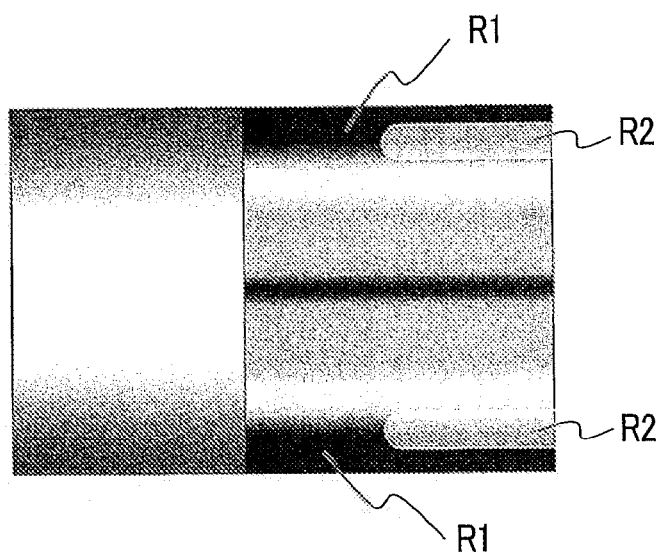
FIG. 1 is a schematic diagram showing a thermal conductivity state when fluid is heated from a location outside a metal tube.
Figure 2:
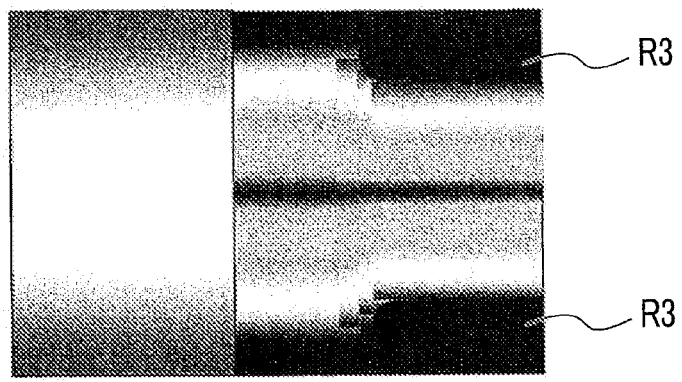
FIG. 2 is a schematic diagram showing the thermal conductivity state when fluid is heated from a location outside the metal tube.
Figure 3:
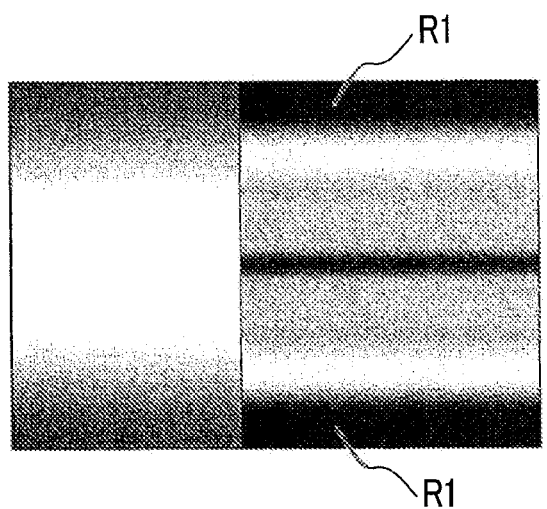
FIG. 3 is a schematic diagram showing the thermal conductivity state when the present invention is applied and fluid is heated from a location outside the metal tube.

A fluid heating apparatus according to the present invention will be explained below. In the specification and the claims, the sign "%" related to density, content, and filling amount represents mass percentage unless otherwise specified.

The fluid heating apparatus according to the invention includes a fluid heating unit provided in a passage or outside the passage, a thermometer, and a pressure control unit provided in the passage. With this configuration, fluid in the passage can be heated to a target temperature while controlling a pressure thereof, and a temperature distribution difference of fluid from upstream side to downstream side of the passage can be reduced. As a result, when the feature of fluid is known, the pressure is controlled such that it becomes equal to or higher than a critical pressure of the fluid, thereby preventing the passage from being locally heated.

For example, when fuel as fluid is heated, if a fuel pressure is low, the fuel comes to a boil and partially becomes gas. At that time, since the thermal conductivity of the gas portion is abruptly lowered, fluid existing between the gaseous portion and a heater is locally heated because heat is not transferred to the gaseous portion and thus, deposit and caulking are prone to be generated. Therefore, by pressurizing fuel so that such gas is not generated, generation of caulking can be suppressed.

In the fluid heating apparatus of the invention, light oil, gasoline, heptane, ethanol, ether, ester and the like can be used as the fluid. A metal tube made of Inconel, hastelloy, titanium alloy, stainless steel or the like may be used as the passage. A flow rate and a flow velocity of fluid in the passage are not limited only if pressure of the fluid can be controlled.

An electric heater and a heat exchanger can be used as the fluid heating unit. It is preferable that the entire tube is uniformly heated. A thermocouple and a Pt resistance thermometer can be used as the thermometer. A pressure pump, a pressure keeping valve, a pressure sensor and the like can be used as the pressure control unit.

In the fluid heating apparatus according to the present invention, it is preferable that a unit that records information of flowing fluid is provided in the passage. When the feature of fluid is unknown, or when composition of material constituting the fluid is varied, it is possible to prevent the passage from being locally heated by dynamically controlling the pressure.

The dynamic pressure control represents feedback control. As a result of such pressure control, the fact that a temperature distribution becomes better (smaller) is fed back, and a pressure control method can be modified. This can be employed when a critical point of fluid is unknown or when composition is varied whenever refueling of gasoline is carried out and the critical point is varied.

More specifically, temperature sensors are disposed at an upstream portion and a downstream portion of the passage, and the temperature difference can be detected. If the temperature difference exceeds a permissible value (a preset value of a system), it is determined that the thermal conductivity is poor (=fluid becomes gas), and control is changed so that the pressure is increased. If the temperature difference is within a permissible range but both the temperatures exceed a target temperature (a set value of the system), it is determined that the thermal conductivity is too excellent (=high density and low viscosity supercritical fluid), and the control is changed so that the pressure is slightly reduced.

[Structure of Fluid Heating Apparatus]

Figure 11:
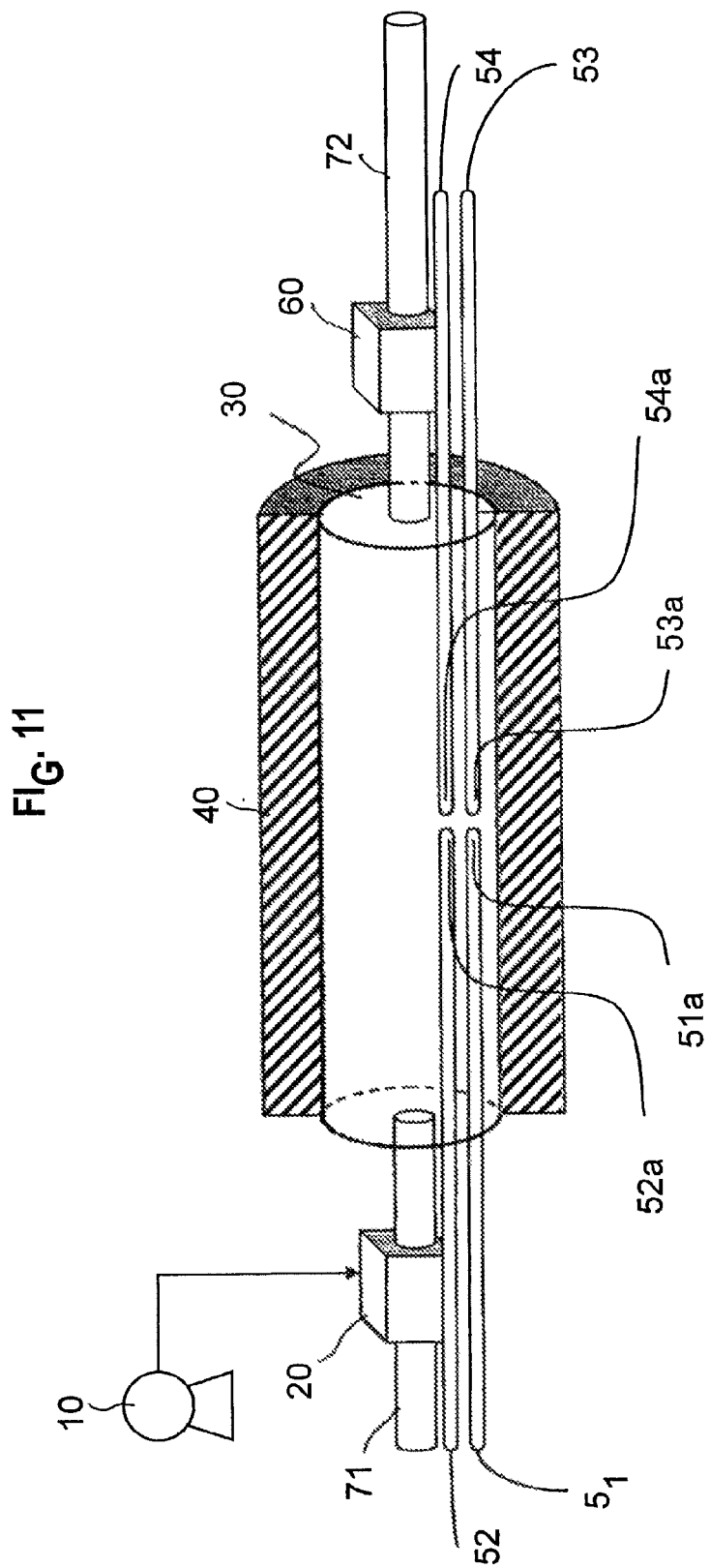
FIG. 11 is a perspective explanatory diagram of the fluid heating apparatus of an embodiment of the present invention in which a portion of a heater is cut.

FIG. 11 is a perspective explanatory diagram of the fluid heating apparatus of an embodiment of the present invention in which a portion of a heater is cut. As shown in FIG. 11, the fluid heating apparatus of the embodiment includes a high pressure pump 10, a pressure sensor 20, a heating chamber 30, a heater 40, thermocouples 51, 52, 53, and 54 which are examples of the fluid temperature measuring unit, a pressure keeping unit 60 (e.g., a capillary or a pressure keeping valve), a fuel take-in portion 71 and a fuel take-out portion 72. The heating chamber 30 and the heater 40 cooperate and function as the fluid heating unit. The high pressure pump 10, the pressure sensor 20 and the pressure keeping unit 60 cooperate and function as the pressure control unit. The pressure keeping unit 60 can include a cooler if necessary.

In the fluid heating apparatus according to the present embodiment, fuel taken from the fuel take-in portion 71 is heated to a target temperature by the heater 40 in the heating chamber 30. While the temperature of the fuel in the heating chamber 30 reaches the target temperature and when a value obtained by subtracting an estimated temperature estimated from temperatures and a temperature difference of temperature measuring portions 51*a* and 52*a* of the thermocouple 51 and 52 disposed upstream in the flowing direction of the fuel, from measured temperatures of temperature measuring portions 53*a* and 54*a* of the thermocouple 53 and 54 disposed downstream is a negative value, the high pressure pump 10, the pressure sensor 20 and the pressure keeping unit 60 cooperate and control pressure to increase the target temperature. The fuel heated to the target temperature is taken out from the fuel take-out portion 72. The thermocouple 51 is in fluid near a catalyst layer on the opposite side from the catalyst layer with respect to the heater 40, and the thermocouple 52 is in fluid at a location opposite from the heater 40 with respect to the thermocouple 51.

[Control Flow in Fluid Heating Apparatus]

Figure 12:
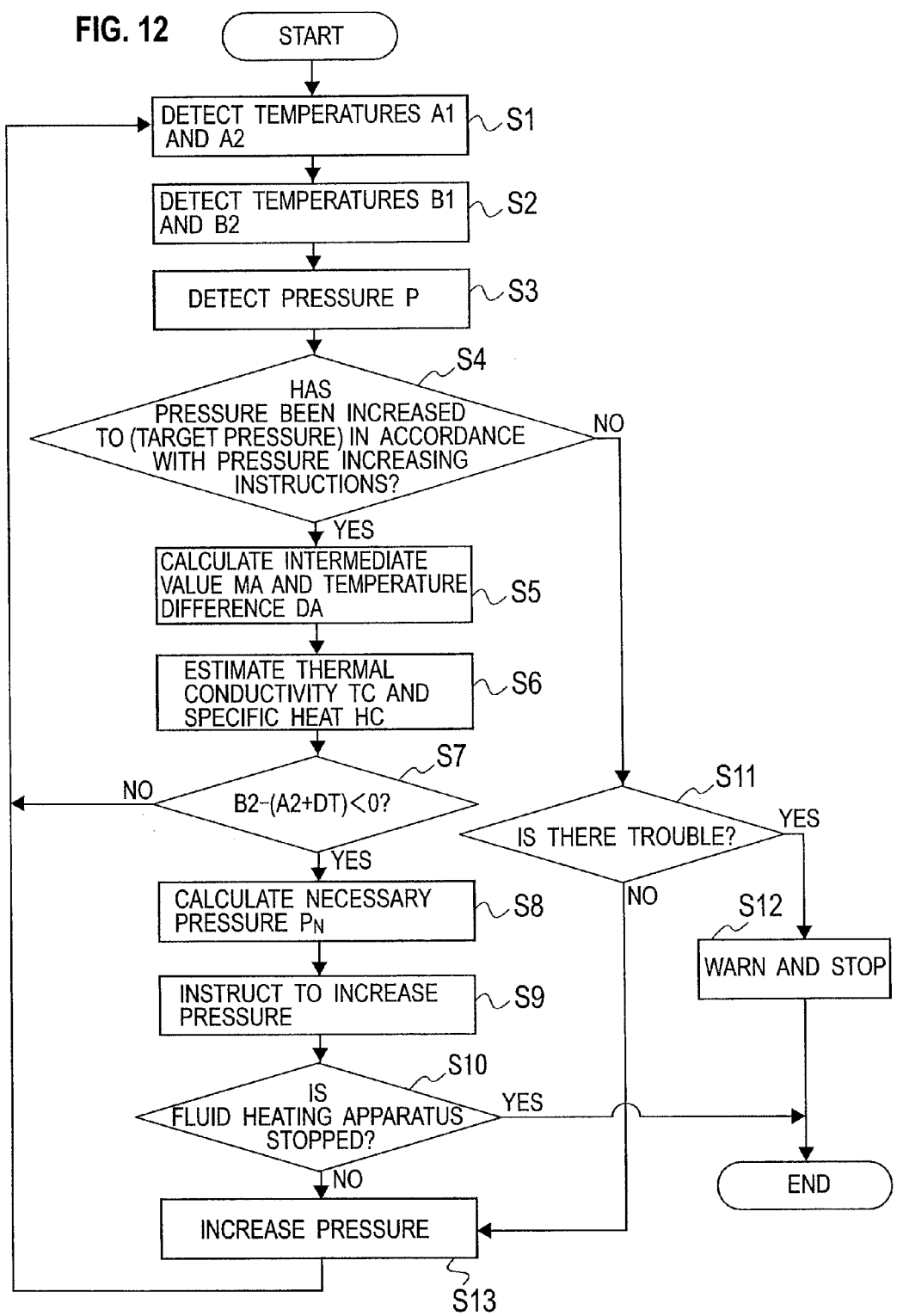
FIG. 12 is a flowchart showing one example of a control flow in the fluid heating apparatus shown in FIG. 11.

FIG. 12 is a flowchart showing one example of a control flow in the fluid heating apparatus. The procedure is advanced from START to STEP 1 (hereinafter, abbreviated as "S1").

In S1, a fluid temperature A1 near a catalyst of the temperature measuring portion 51*a* is detected by the thermocouple 51, a fluid temperature A2 of the temperature measuring portion 52*a* is detected by the thermocouple 52, and the procedure is advanced to S2.

In S2, a fluid temperature B1 near a catalyst of the temperature measuring portion 53*a* is detected by the thermocouple 53, a fluid temperature B2 of the temperature measuring portion 54*a* is detected by the thermocouple 54, and the procedure is advanced to S3.

In S3, a pressure P is detected by the pressure sensor 20, and the procedure is advanced to S4.

In S4, it is determined whether the pressure is increased in accordance with pressure increasing instructions (target pressure), and if the pressure is increased (YES), the procedure is advanced to S5. On the other hand, in S4, it is determined whether the pressure is increased in accordance with pressure increasing instructions (target pressure), and if the pressure is not increased (NO), the procedure is advanced to S11.

In S5, a temperature intermediate value MA and a temperature difference DA are calculated from the detected temperature A1 and temperature A2, and the procedure is advanced to S6.

In S6, thermal conductivity TC and specific heat HC of fluid are estimated from the detected pressure P and the calculated temperature intermediate value MA, and the procedure is advanced to S7.

$$MA=(A1+A1)/2 \tag{1}$$

$$DA=A1-A2 \tag{2}$$

$$TC=f(MA, P) \tag{3}$$

$$HC=g(MA, P) \tag{4}$$

$$Q=TC*DA/d1 \tag{5}$$

$$T=d2/R \tag{6}$$

$$DT=Q/HC*T \tag{7}$$

$$B2-(A2+DT)<0 \text{ IF YES} \rightarrow S8 \tag{8}$$

In S7, a heat transfer amount Q is calculated from the product of the calculated temperature difference DA, the estimated thermal conductivity TC, and the distance d1 (distance between the temperature measuring portion 51*a* and the temperature measuring portion 52*a*). Transit time T obtained by dividing distances d2 between the temperature measuring portions 51*a*, 52*a*, 53*a*, and the temperature measuring portions 51*a* and 53*a* by a linear velocity R around the 54*a* is calculated. A temperature variation estimated value DT obtained by dividing a product of the heat transfer amount Q and the transit time T by the specific heat HC is calculated. If a value obtained by adding DT to A2 of the temperature measuring portion 52*a* is subtracted from the B2 value of the temperature measuring portion 54*a* is negative (YES), the procedure is advanced to S8. On the other hand, if the value is not negative (NO), the procedure is advanced to S1.

In S8, a necessary pressure PN is calculated and the procedure is advanced to S9.

In S9, instructions for increasing pressure are output and the procedure is advanced to S10.

In S10, it is determined whether the fluid heating apparatus is stopped, and if the fluid heating apparatus should be stopped (YES), the procedure is advanced to END. It is determined in S10 whether the fluid heating apparatus is stopped, and if the fluid heating apparatus should not be stopped (NO), the procedure is advanced to S13.

In S11, it is determined whether the fluid heating apparatus has a trouble, and if the fluid heating apparatus has a trouble (YES), the procedure is advanced to S12. It is determined in S11 whether the fluid heating apparatus has a trouble, and if the fluid heating apparatus does not have a trouble (NO), the procedure is advanced to S13.

In S12, a warning is given, the fluid heating apparatus is stopped, and the procedure is advanced to END.

In S13, the pressure is increased and the procedure is advanced to S1.

[Fluid Heating Method]

According to the present invention, when fluid is heated using the fluid heating apparatus, the pressure control unit controls a pressure such that the pressure of the fluid becomes equal to or higher than a critical pressure. By keeping the pressure of fluid at the value equal to or higher than the critical pressure, it is possible to prevent gas from being generated, to prevent the thermal conductivity from lowering, and to uniformize the temperature distribution on the upstream side and downstream side of the passage in the flowing direction of fluid. It is possible to uniformize the temperature distribution in the direction of a cross section of the passage.

More specifically, it is preferable that pressure is controlled such that the thermal conductivity of fluid existing in and near an inner wall of a passage becomes equal to or higher than $0.06\ W \cdot m^{-1} K^{-1}$, and the temperature difference is preferably 5° C. or less. Under this condition, it is possible to avoid the local heating and to suppress the generation of caulking.

Figure 4:
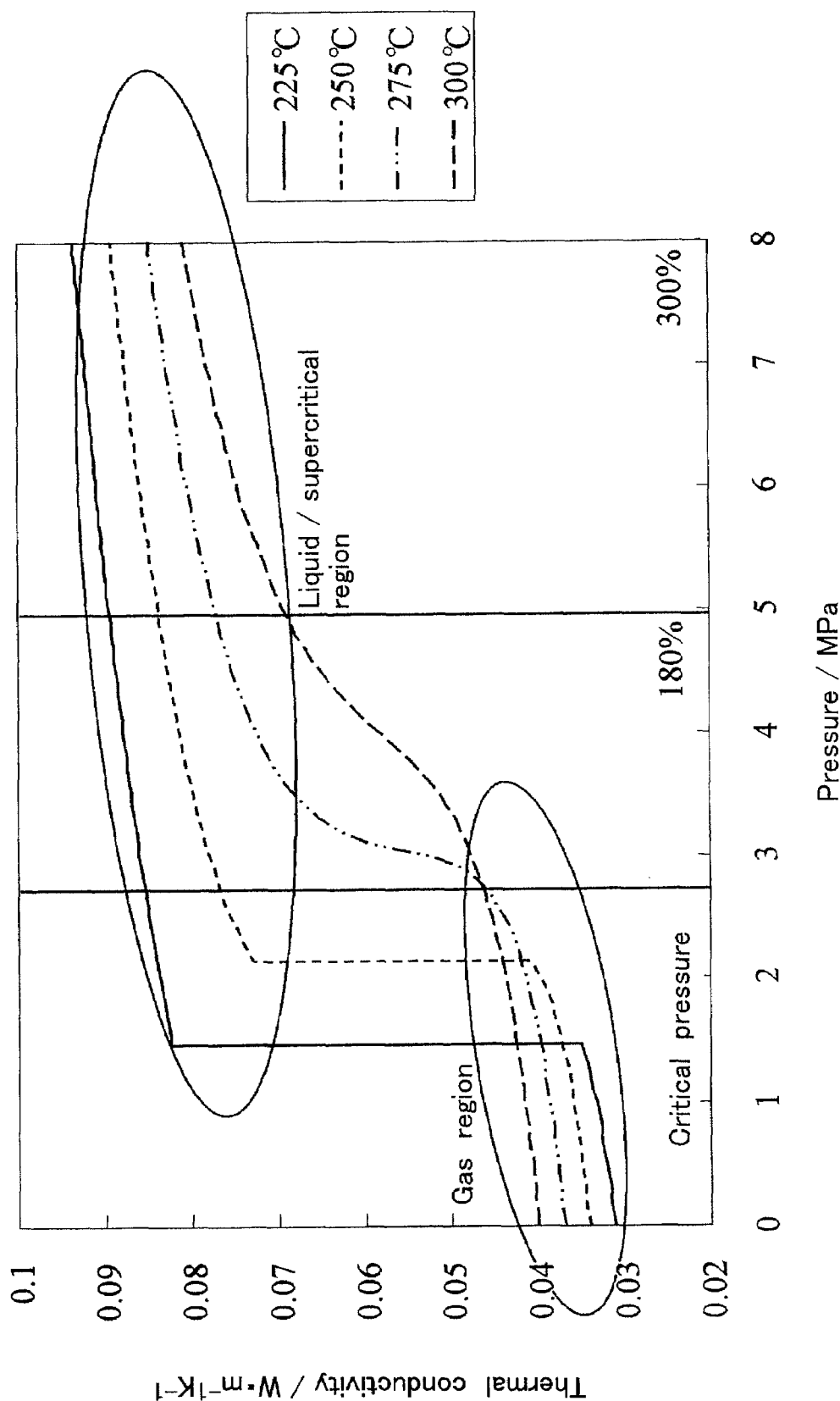
FIG. 4 is a graph showing variation in thermal conductivity of heptane.

As shown in FIG. 4, when heptane is used as fluid, control should be performed such that the thermal conductivity becomes equal to or higher than $0.06\ W \cdot m^{-1} K^{-1}$ by setting the pressure equal to or higher than a critical pressure of heptane. Under this condition, pressure of fluid can be controlled such that it becomes equal to or higher than 180% of the critical pressure. With this configuration, when gasoline or ethanol is used as fluid, it is possible to maintain thermal conductivity of $0.06\ W \cdot m^{-1} K^{-1}$ or higher even when the temperature is increased to about 300° C. In other words, in a temperature range of about 300° C., it is possible to prevent fluid that is to be heated from becoming gas, and it is possible to prevent caulking from being generated.

It is possible to perform the control such that pressure of fluid becomes 300% or higher of the critical pressure. With this configuration, when light oil, ether or ester is used as fluid, even when the fluid is heated to about 500° C., thermal conductivity of $0.06\ W \cdot m^{-1} K^{-1}$ can be maintained. In other words, in a temperature range of about 500° C., it is possible to prevent fluid that is to be heated from becoming gas, and it is possible to prevent caulking from being generated.

Figure 10:
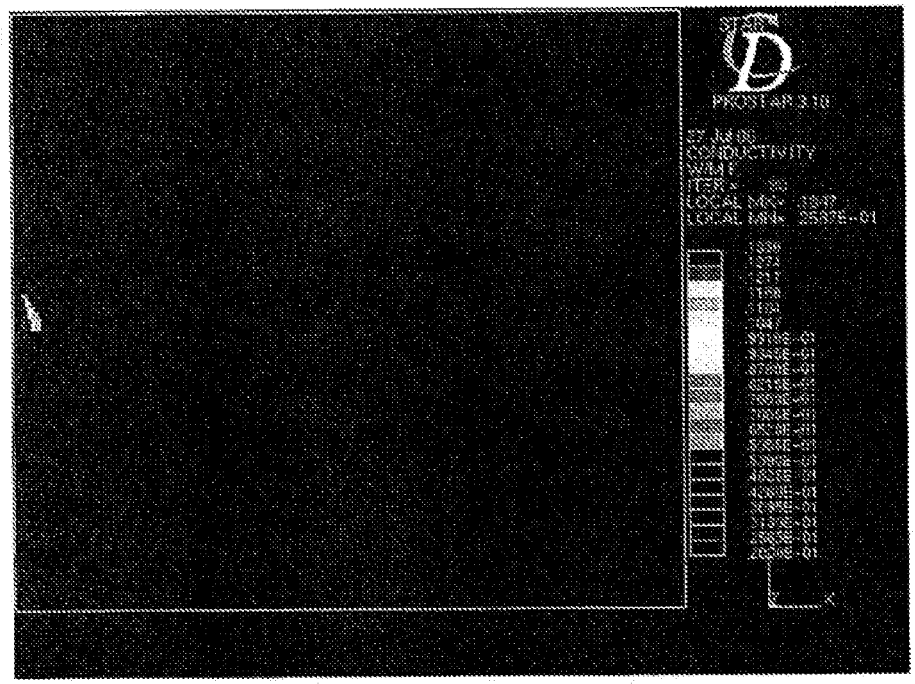
FIGS. 10 show simulation data of a temperature distribution of 673 K, 2.0 MPa and a distribution of thermal conductivity.
Figure 10:
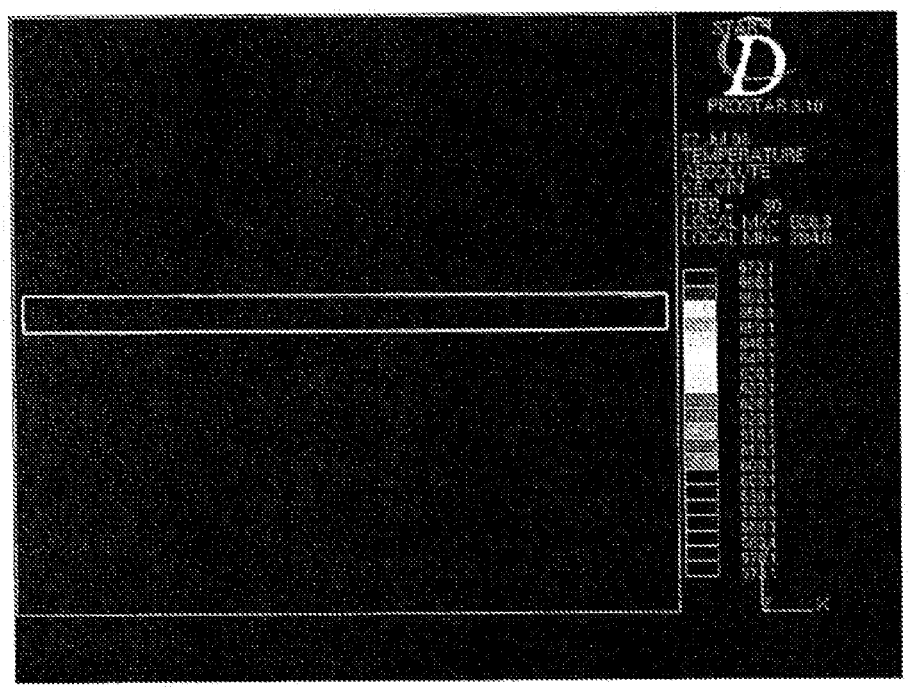

Simulation data shown in FIGS. 5(a) and (b) to FIGS. 10(a) and (b) will be explained. The simulation was carried out under the following conditions. A cylindrical tube having a cross-sectional area of 1 cm² and length of 10 cm was used, heptane flows through the cylindrical tube from upstream (left side in the drawing) to downstream (right side in the drawing), the tube wall temperature was fixed to 400° C., and the pressure was varied with respect to a critical pressure 2.74 MPa of heptane, and a temperature distribution and a thermal conductivity distribution were calculated. Only a region of a center angle 15° around the cylindrical tube was calculated utilizing symmetry.

Figure 5:
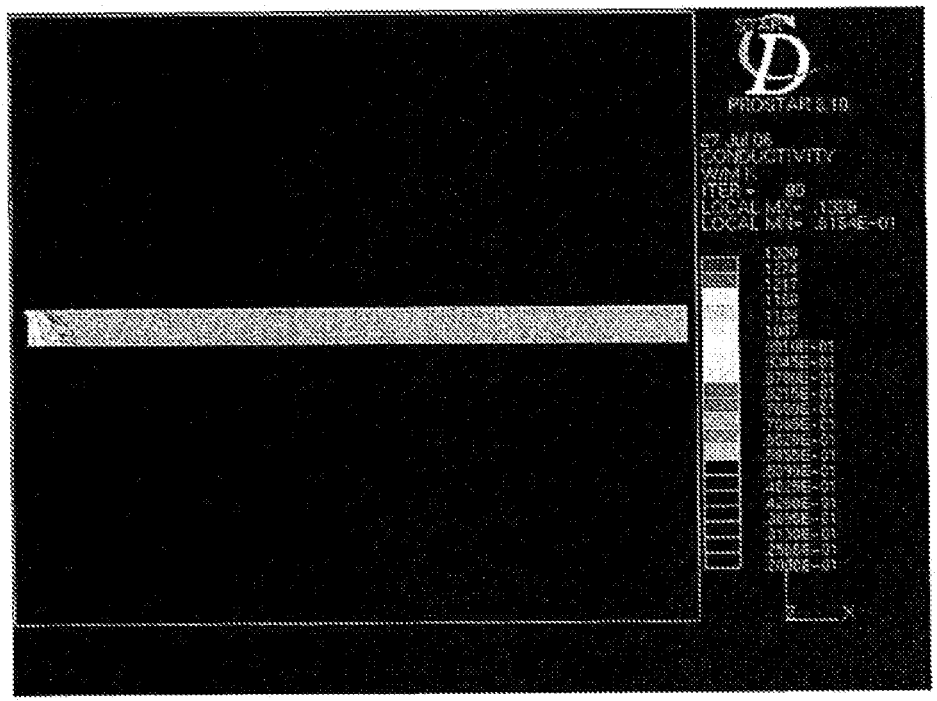
FIGS. 5 show simulation data of a temperature distribution of 673 K, 2.5 MPa and a distribution of thermal conductivity.
Figure 5:
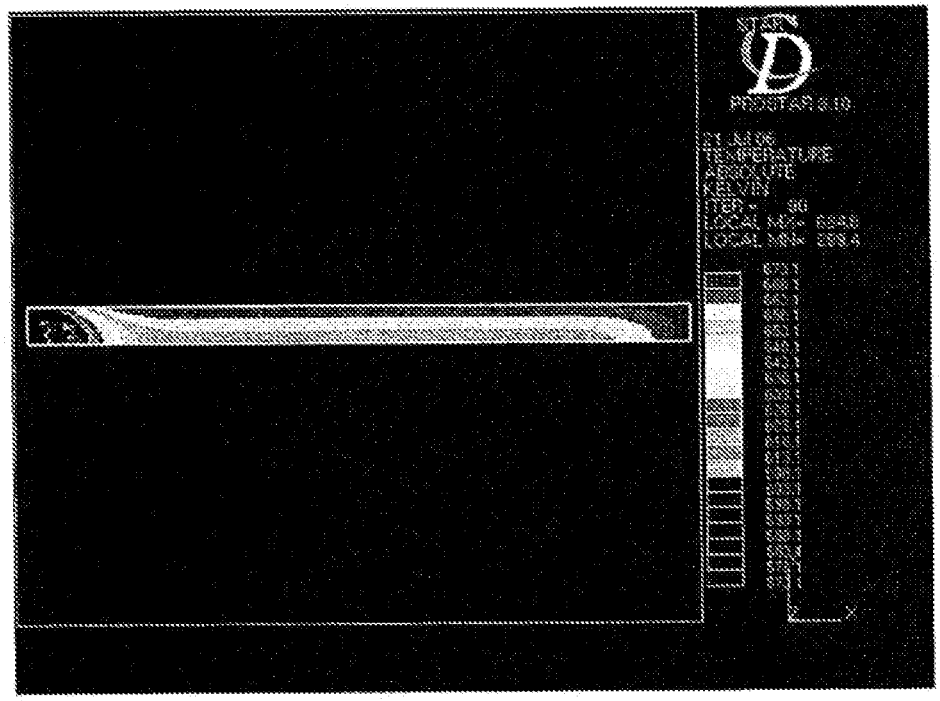
Figure 6:
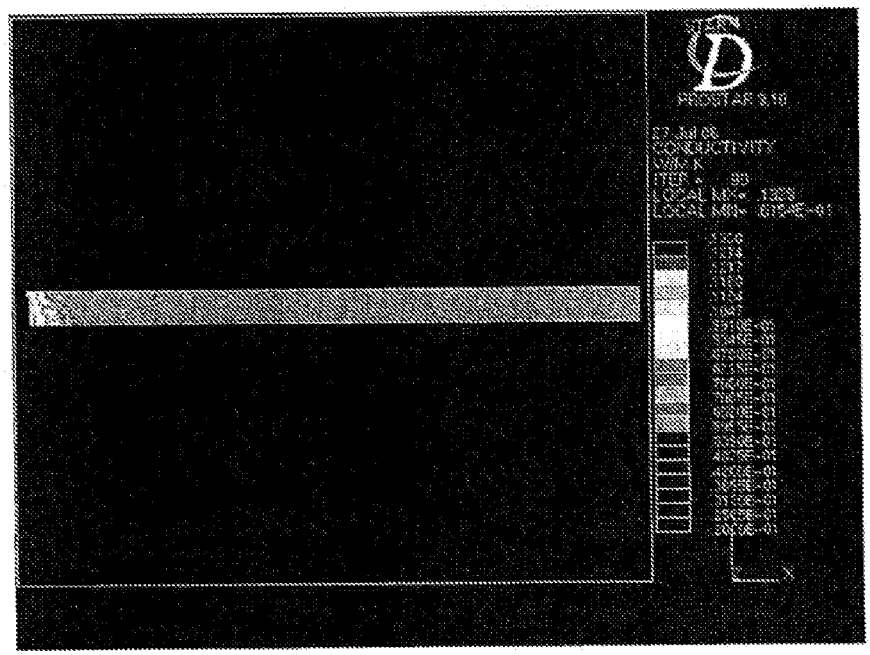
FIGS. 6 show simulation data of a temperature distribution of 673 K, 3.0 MPa and a distribution of thermal conductivity.
Figure 6:
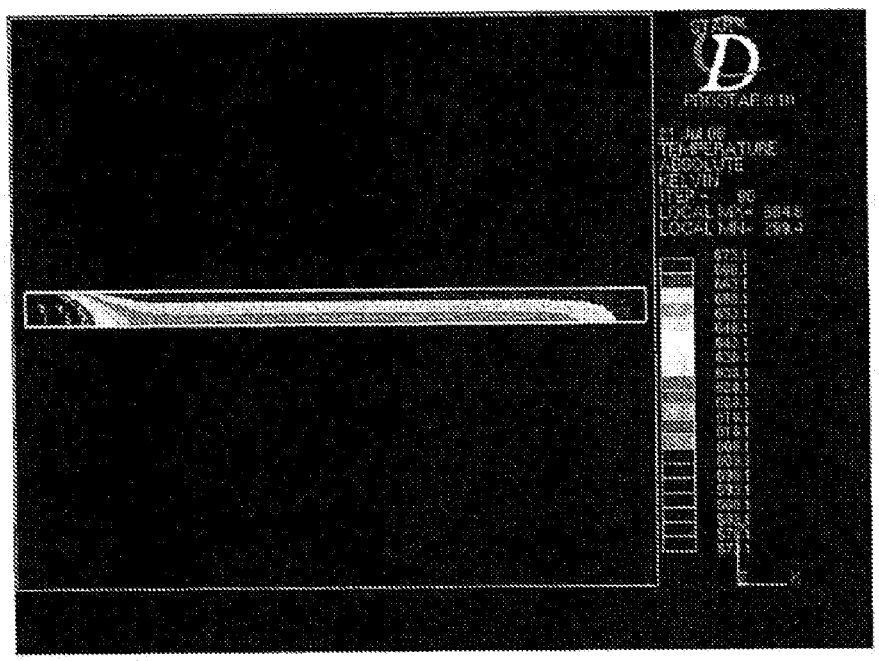
Figure 7:
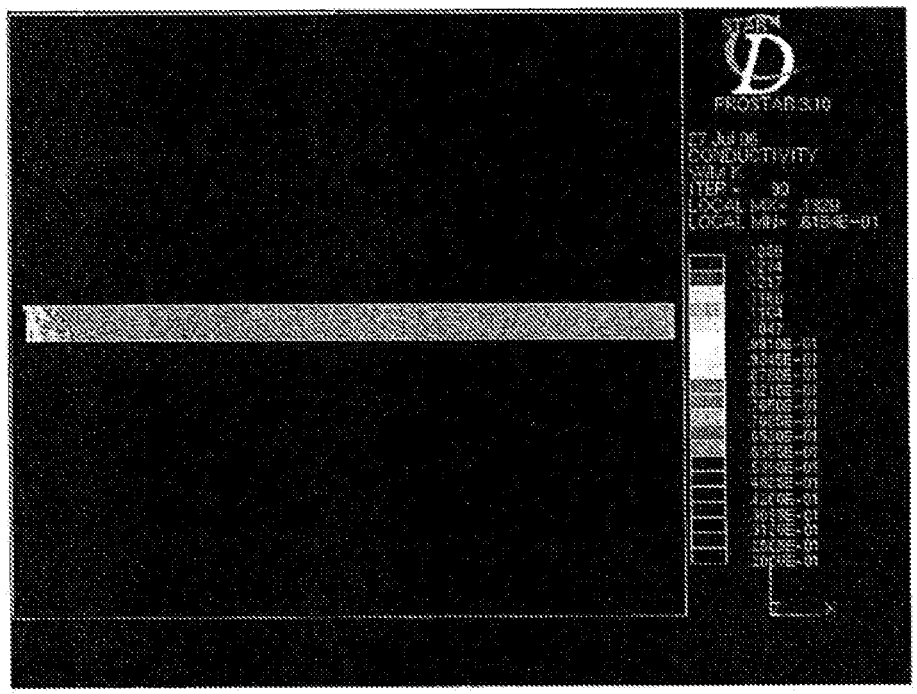
FIGS. 7 show simulation data of a temperature distribution of 673 K, 4.0 MPa and a distribution of thermal conductivity.
Figure 7:
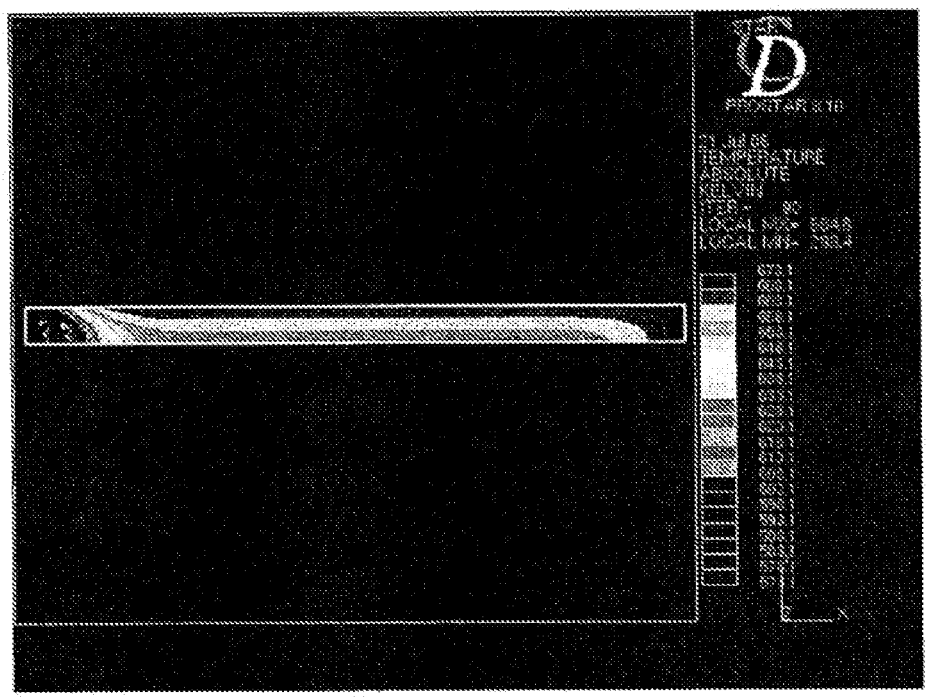
Figure 8:
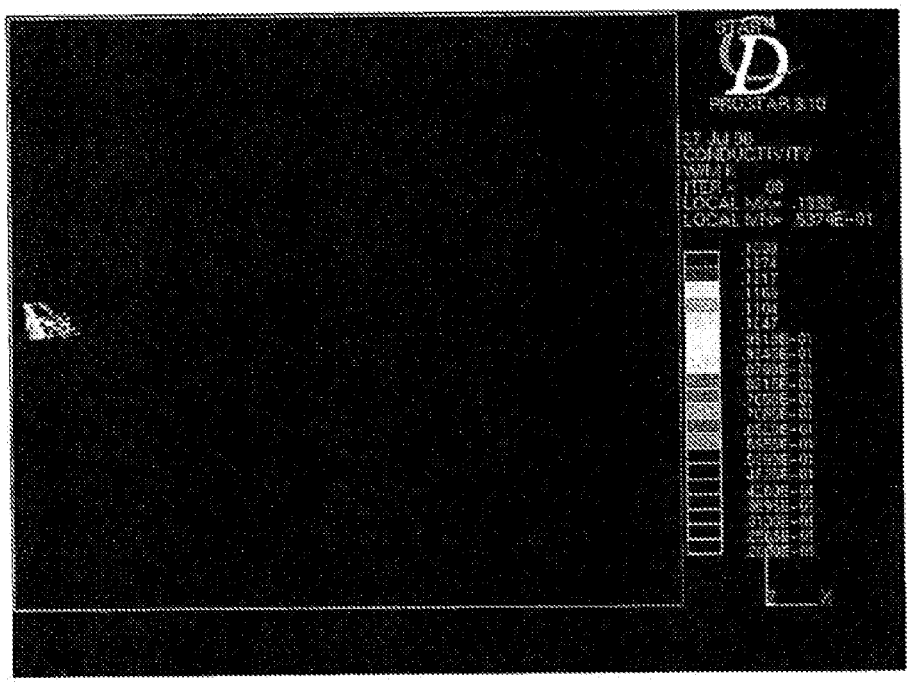
FIGS. 8 show simulation data of a temperature distribution of 673 K, 0.1 MPa and a distribution of thermal conductivity.
Figure 8:
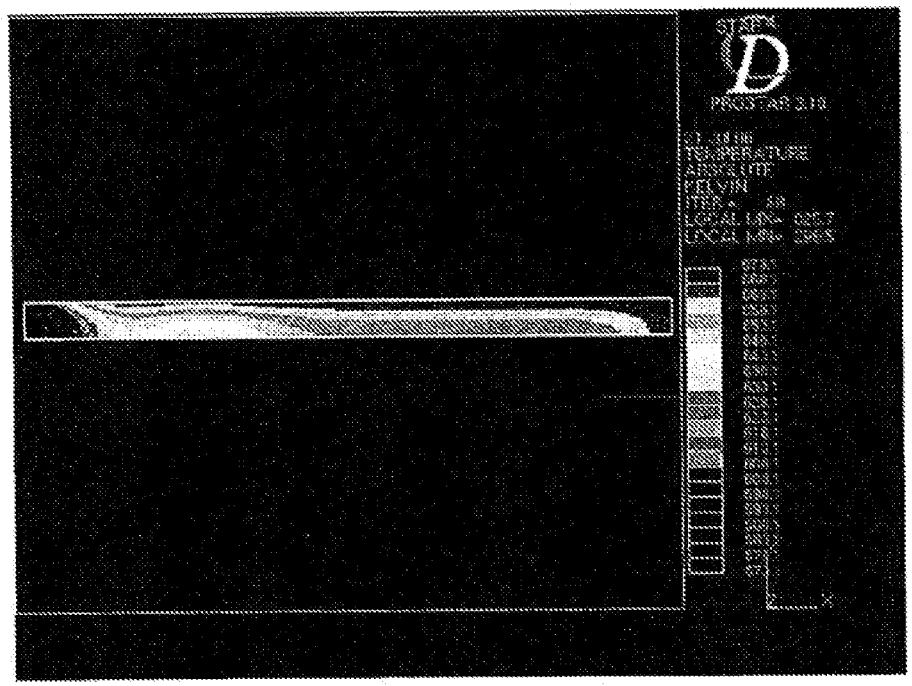
Figure 9:
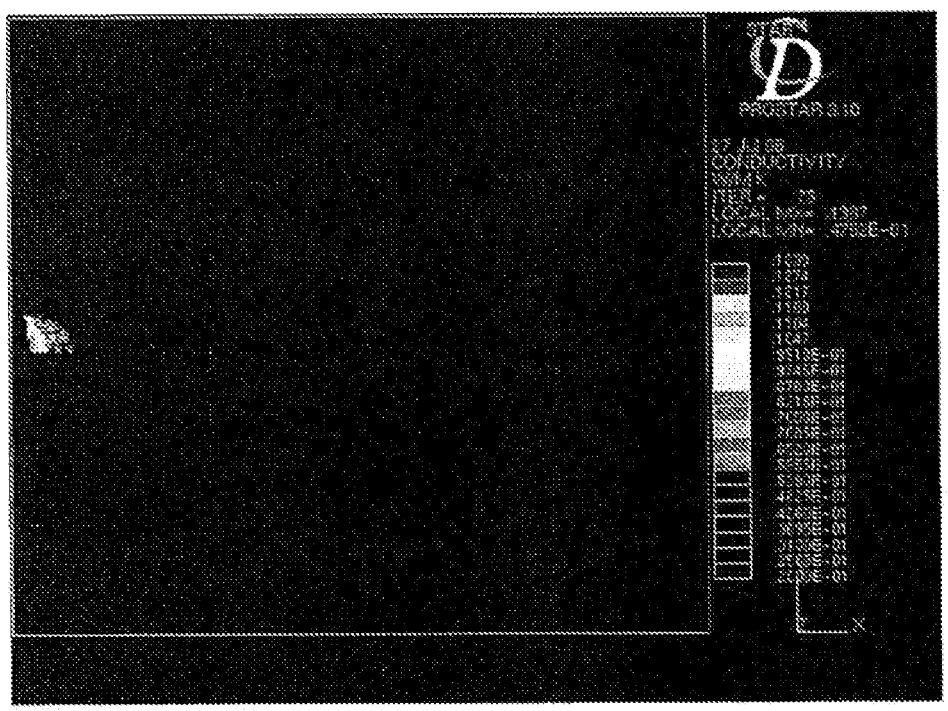
FIGS. 9 show simulation data of a temperature distribution of 673 K, 1.5 MPa and a distribution of thermal conductivity.
Figure 9:
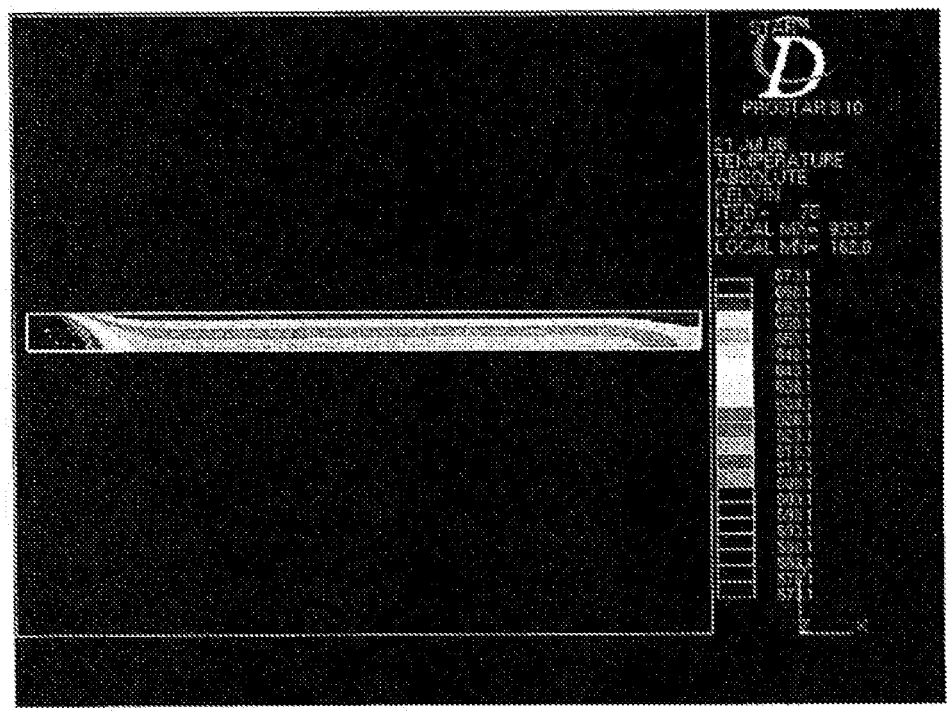

FIGS. 5(a) and 5(b) show simulation data of a temperature distribution and thermal conductivity distribution under pressure of 2.5 MPa. It is conceived that this pressure is in subcritical region with respect to the critical pressure of heptane, but it is found that if the temperature distribution is viewed, the temperature distribution in the direction of a cross section of the tube at a downstream terminal end of the cylindrical tube is uniform by employing this pressure. On the other hand, in the thermal conductivity distribution, it is found that the thermal conductivity is equal to or higher than $0.06\ W \cdot m^{-1} K^{-1}$ in any section, the thermal conductivity is maintained. FIGS. 6(a), 6(b), 7(a), and 7(b) show simulation data when the pressure is 3.0 MPa and 4.0 MPa, respectively. In any cases, the region is a supercritical region higher than the critical pressure of heptane, but like the case shown in FIGS. 5(a) and (b), the temperature distribution in the direction of the cross section of the tube at downstream end of the cylindrical tube is uniform, and the thermal conductivity is kept at $0.06\ W \cdot m^{-1} K^{-1}$ or higher. With this configuration, the heat of the tube wall is efficiently transferred to the fuel, fuel near the tube wall is not locally heated and precipitation of carbon can be avoided.

FIGS. 8(a), 8(b), 9(a), 9(b), 10(a), and 10(b) show simulation data when the pressure is 0.1 MPa, 1.5 MPa and 2 MPa, respectively. The pressure is not in the subcritical region or supercritical region with respect to the critical pressure of heptane. It is found that the temperature in the direction of the cross section of the tube at the downstream end of the cylindrical tube is distributed very widely in this pressure range, and the distribution is not uniform. It is found that the thermal conductivity is less than $0.06\ W \cdot m^{-1} K^{-1}$ in a section downstream from 2 cm from upstream of the cylindrical tube, and the thermal conductivity is not maintained.

EXAMPLES

The present invention will be explained below in further detail by several Examples. However, the present invention is not limited thereto.

Example 1

Figure 13:
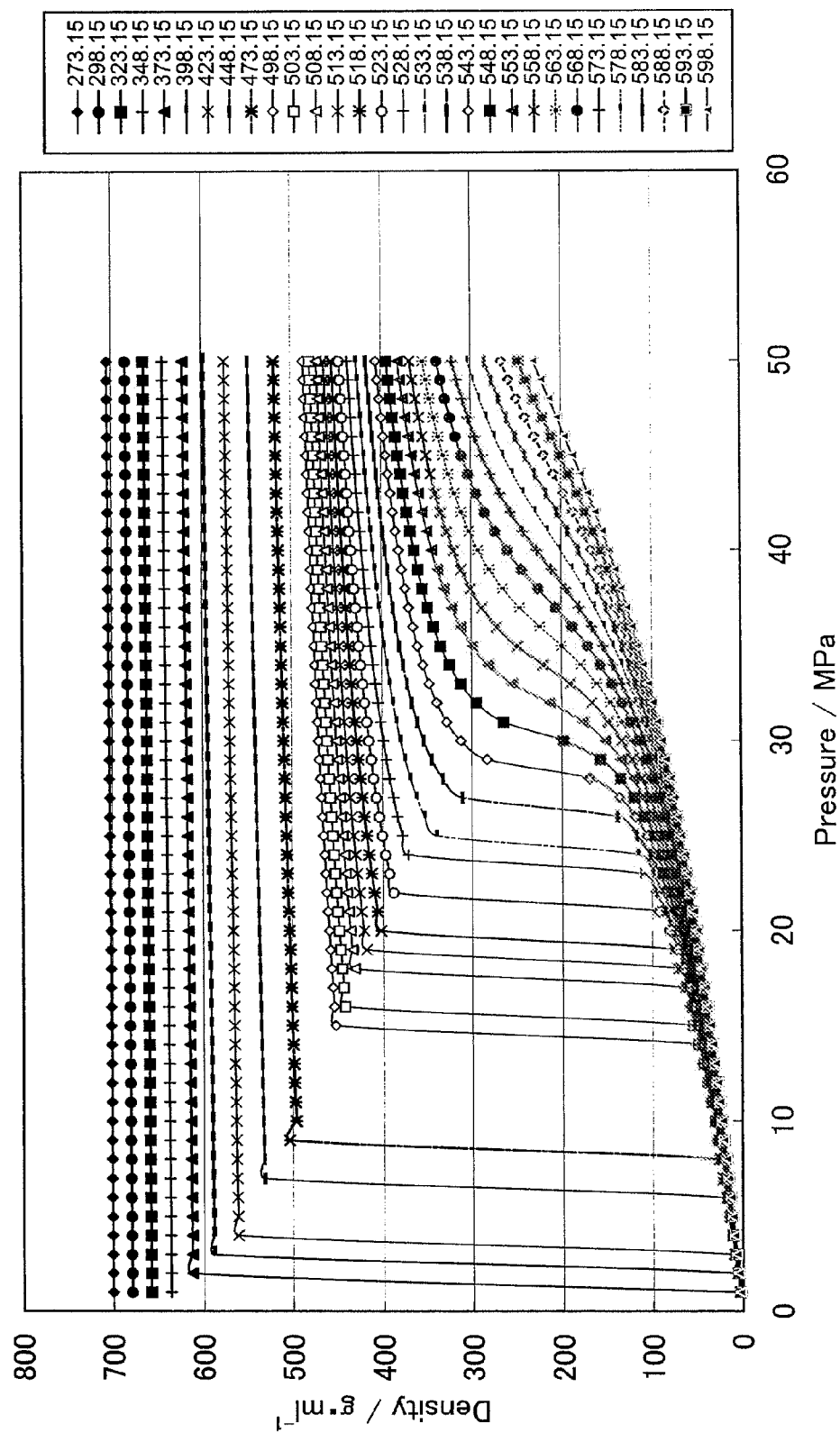
FIG. 13 is a graph showing a relation of the pressure and density of heptane at each temperature.

A state of heptane in the heating chamber was varied by the fluid heating unit and the pressure control unit using the fluid heating apparatus (the heating chamber is of a cylindrical shape having a cross sectional area of 1 cm² and length of 10 cm also in the following other examples) as shown in FIG. 11. The pressure and density of the heptane at each temperature at that time were measured. FIG. 13 shows the obtained result. FIG. 13 is a graph showing a relation of the pressure and density of heptane at each temperature.

Example 2

Figure 14:
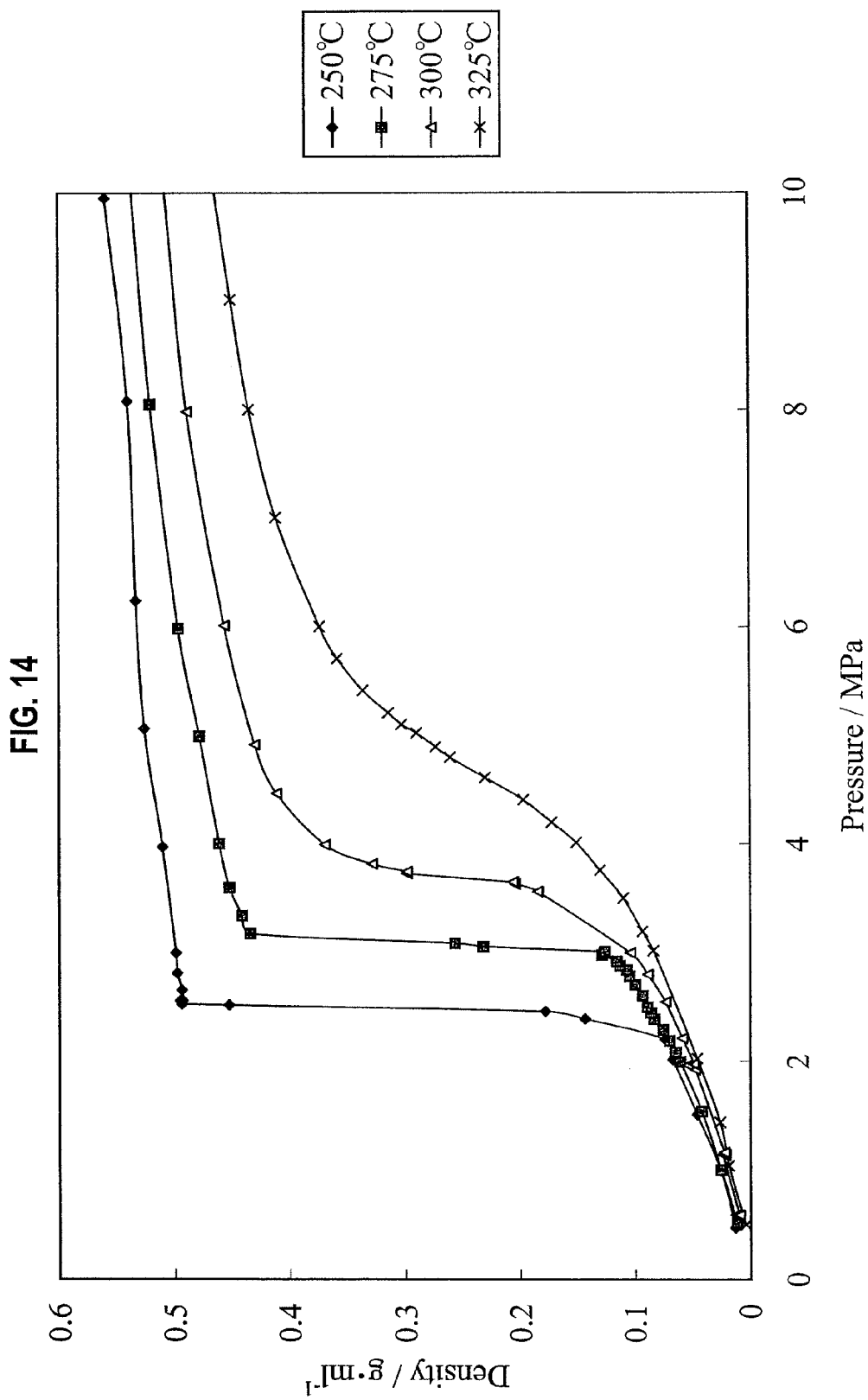
FIG. 14 is a graph showing a relation of the pressure and density of gasoline at each temperature.

A state of gasoline in the heating chamber was varied by the fluid heating unit and the pressure control unit using the fluid heating apparatus shown in FIG. 11. The pressure and density of the gasoline at each temperature at that time were measured. FIG. 14 shows the obtained result. FIG. 14 is a graph showing a relation of the pressure and density of gasoline at each temperature.

Example 3

Figure 15:
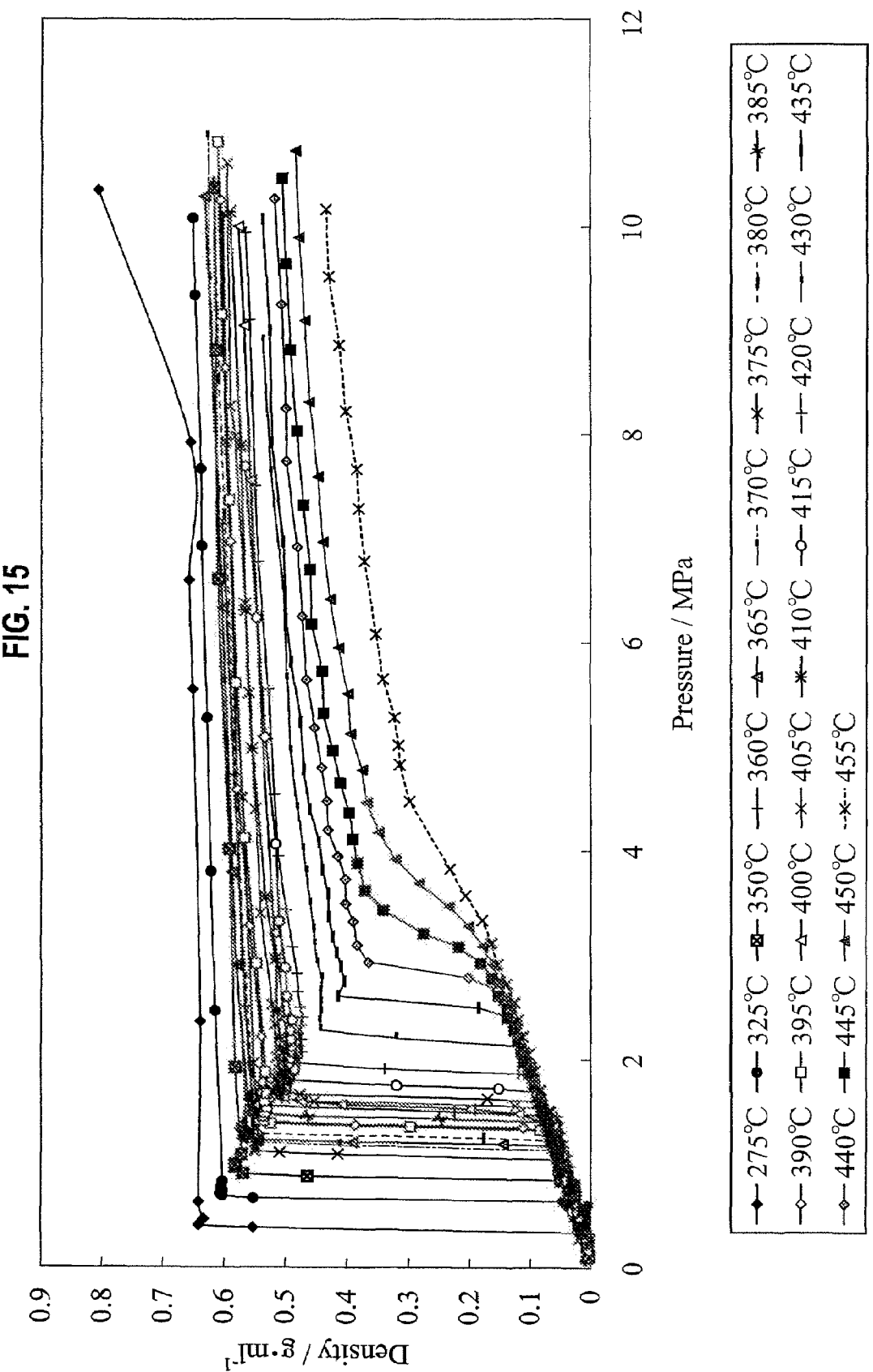
FIG. 15 is a graph showing a relation of the pressure and density of light oil at each temperature.

A state of light oil (JIS 2) in the heating chamber was varied by the fluid heating unit and the pressure control unit using the fluid heating apparatus shown in FIG. 11. The pressure and density of the light oil at each temperature at that time were measured. FIG. 15 shows the obtained result. FIG. 15 is a graph showing a relation of the pressure and density of light oil at each temperature.

Industrial Applicability

The present invention is applicable to a fluid heating apparatus capable of avoiding local heating in a passage and suppressing carbon precipitation.

The invention claimed is:

1. A fluid heating apparatus which heats fluid to a target temperature, comprising:
   a fluid heating unit comprising a heating chamber and a heater disposed around the heating chamber, and heats the fluid in the heating chamber;
   a fluid temperature measuring unit that measures a temperature of the fluid, and comprises two temperature sensors disposed in the heating chamber, one of the temperature sensors being arranged on an upstream side of the heating chamber in a flow direction of the fluid, and an other of the temperature sensors being arranged on a downstream side of the heating chamber in the flow direction; and
   a pressure control unit that controls a pressure of the fluid in the heating chamber such that the pressure becomes equal to a target pressure,
   wherein while the fluid in the heating chamber is heated to the target temperature and when a temperature difference of fluid measured by the two temperature sensors exceeds a predetermined value, the pressure control unit increases the target pressure of the fluid.

2. The fluid heating apparatus according to claim 1, further comprising a unit that records information of the fluid as the fluid flows.

3. The fluid heating apparatus according to claim 1, wherein the pressure control unit controls the pressure of the fluid such that the pressure of the fluid becomes equal to or higher than a critical pressure of the fluid.

4. The fluid heating apparatus according to claim 3, wherein the pressure control unit controls the pressure of the fluid such that a thermal conductivity of the fluid existing at and near an inner wall of the heating chamber becomes equal to or higher than 0.06 W·m$^{-1}$K$^{-1}$.

5. The fluid heating apparatus according to claim 3, wherein the pressure control unit controls the pressure of the fluid such that the pressure of the fluid becomes equal to or higher than 180% of the critical pressure.

6. The fluid heating apparatus according to claim 3, wherein the pressure control unit controls the pressure of the fluid such that the pressure of the fluid becomes equal to or higher than 300% of the critical pressure.

7. The fluid heating apparatus according to claim 2, wherein the pressure control unit controls the pressure of the fluid such that the pressure of the fluid becomes equal to or higher than a critical pressure of the fluid.

8. The fluid heating apparatus according to claim 7, wherein the pressure control unit controls the pressure of the fluid such that a thermal conductivity of the fluid existing at and near an inner wall of the heating chamber becomes equal to or higher than 0.06 W·m$^{-1}$K$^{-1}$.

9. The fluid heating apparatus according to claim 7, wherein the pressure control unit controls the pressure of the fluid such that the pressure of the fluid becomes equal to or higher than 180% of the critical pressure.

10. The fluid heating apparatus according to claim 4, wherein the pressure control unit controls the pressure of the fluid such that the pressure of the fluid becomes equal to or higher than 180% of the critical pressure.

11. The fluid heating apparatus according to claim 8, wherein the pressure control unit controls the pressure of the fluid such that the pressure of the fluid becomes equal to or higher than 180% of the critical pressure.

12. The fluid heating apparatus according to claim 7, wherein the pressure control unit controls the pressure of the fluid such that the pressure of the fluid becomes equal to or higher than 300% of the critical pressure.

13. The fluid heating apparatus according to claim 4, wherein the pressure control unit controls the pressure of the fluid such that the pressure of the fluid becomes equal to or higher than 300% of the critical pressure.

14. The fluid heating apparatus according to claim 8, wherein the pressure control unit controls the pressure of the fluid such that the pressure of the fluid becomes equal to or higher than 300% of the critical pressure.

* * * * *